United States Patent [19]

Brumbill

[11] Patent Number: 4,785,067
[45] Date of Patent: Nov. 15, 1988

[54] PROTECTIVE COATING AND METHOD OF MAKING THE SAME

[75] Inventor: Douglas R. Brumbill, Fowlerville, Mich.

[73] Assignee: Genesee Polymers Corporation, Flint, Mich.

[21] Appl. No.: 30,464

[22] Filed: Mar. 25, 1987

Related U.S. Application Data

[63] Continuation of Ser. No. 852,986, Apr. 16, 1986, abandoned.

[51] Int. Cl.$^4$ ............................................. C08G 77/04
[52] U.S. Cl. ..................................... 528/26; 528/26.5; 528/38; 556/419; 556/420; 556/425; 106/8; 106/287.11
[58] Field of Search ...................... 556/419, 425, 420; 528/26, 26.5, 38; 106/8, 287.11

[56] References Cited

U.S. PATENT DOCUMENTS

| | | | |
|---|---|---|---|
| 2,972,598 | 2/1961 | Morehouse | 556/425 |
| 3,717,575 | 2/1973 | Rankin | 556/425 |
| 3,890,269 | 6/1975 | Martin | 556/425 |
| 4,374,236 | 2/1983 | Znaiden | 528/26.5 |
| 4,507,455 | 3/1985 | Tangney et al. | 556/419 |

OTHER PUBLICATIONS

American Heritage Dictionary, Second College Edition, 1982, p. 667.

*Primary Examiner*—Melvyn I. Marquis
*Attorney, Agent, or Firm*—Reising, Ethington, Barnard, Perry & Milton

[57] ABSTRACT

A protective coating consists essentially of a polysiloxane copolymer characterized by being prepared by the reaction of a trimethyl end blocked polyamine silicone fluid including amino alkyl groups with a saturated aliphatic carboxylic acid to produce a polysiloxane copolymer including alkyl amine groups and either amide groups or amine salts or the combination thereof. The polysiloxane copolymer is utilized alone or with additives to produce a high gloss detergent resistant, and rust protective coating.

12 Claims, No Drawings

PROTECTIVE COATING AND METHOD OF MAKING THE SAME

This is a continuation of application Ser. No. 852,986 filed on Apr. 16, 1986 now abandoned.

TECHNICAL FIELD

The instant invention relates to coating compositions which may be used alone or in combination with other formulations well known in the art to impart a protective coating upon a substrate. More particularly, the present coating composition may be used to protect such substrates as leather, rubber, vinyl or metal.

BACKGROUND ART

It is highly desirable for silicone protective coatings to provide a durable high gloss finish to surfaces such as auto bodies, vinyl, rubber and leather goods. In combination with these properties, detergent resistance is necessary in order to withstand washings during the normal course of use.

Amine functional silicone coatings commonly used as auto polishes are not corrosion resistant in thin polish films and allow gaseous molecules to penetrate the polymer network.

The salt formed by reaction of alkoxy end blocked amine functional silicones and organic type corrosion inhibitors, such as phenyl stearic acid has been found to provide improved durability to polish formulations. The phenyl stearic acid, silicone amine salt also improves the compatability of silicone fluid with organic waxes (Soap/Cosmetic/Chemical Specialities, July 1971). Examples of alkoxy end blocked organo polysiloxane copolymers including salts of aliphatic carboxylic acids are disclosed in the U.S. Pat. Nos. 3,544,498 to Holdstock et al, issued Dec. 1, 1970 and 3,576,779 to Holdstock et al, issued Apr. 27, 1971. These formulations provided compositions of improved detergent resistancy. Other detergent resistant polish compositions include an alkoxy end blocked amino functional silicone fluid combined with a hydroxyl terminated group polysiloxane and/or silicone resins. An example of this composition is disclosed in the U.S. Pat. No. 3,960,575 to Martin, issued June 1, 1976.

Through continued use, it has been found that these prior art protective coatings lack a combination of good detergent resistance with the other desirable qualities of a protective coating, such as gloss, ease of rub-out, and rust resistance.

The instant invention provides a new composition and method of making the same wherein a trimethyl end blocked polyamine silicone fluid is combined with a fatty acid to derive a polysiloxane fluid including a combination of amide or amine salts and free, unreacted amine alky groups. The resulting polysiloxane copolymer, alone or in combination with other additives, provides improved desirable properties of detergent resistance, gloss, and ease of rub out, in combination with excellent rust resistance characteristics.

SUMMARY OF THE INVENTION

The present invention provides a protective coating consisting essentially of a polysiloxane copolymer characterized by being prepared by reacting a trimethyl end blocked polyamine silicone fluid including amino alkyl groups with a saturated aliphatic carboxylic acid to produce a polysiloxane copolymer containing either (a) alkyl amine groups and amide groups (b) alkyl amine groups and amine salts; (c) alkyl amine groups, amide groups, and amine salts.

The present invention further provides the method of making the protective coating including the steps of mixing the trimethyl end blocked polyamine silicone fluid including the amino alkyl groups with a saturated aliphatic carboxylic acid.

A polysiloxane copolymer is produced including (a) alkyl amine groups and amide groups (b) alkyl amine groups and amine salts; (c) alkyl amine groups amide groups, and amine salts.

DETAILED DESCRIPTION OF THE INVENTION

The instant invention is generally a a protective coating and method of manufacture thereof. The resultant copolymer product contains free amino groups, along with (a) amido or (b) amine/carboxylic acid salt or a combination of (a) and (b). The amine silicone and carboxylic acid reaction products are grafted together to yield a composition which is particularly useful in car polish applications. The composition may be used alone as a car polish or may be incorporated into well known car polish formulations to provide improved gloss, excellent detergent resistance, and beading when compared to conventional amine functional fluids.

The protective coating consists essentially of a polysiloxane copolymer characterized by being prepared by reacting a trimethyl end blocked polyamine silicone fluid including amino alkyl groups with a saturated aliphatic carboxylic acid to produce the polysiloxane copolymer including free amine groups and amide groups. The fluid can also include amine salts or the combination of amide groups and amine salts. In either composition, the copolymer includes unreacted amine groups.

More particularly, the polysiloxane copolymer is prepared by the reaction of a trimethyl end blocked polyamine silicone fluid having the formula

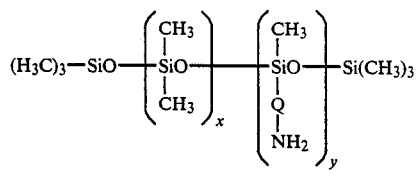

with Z moles of the saturated aliphatic carboxylic acid having the formula

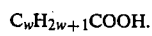

The mixtures yields a polysiloxane copolymer having the formula

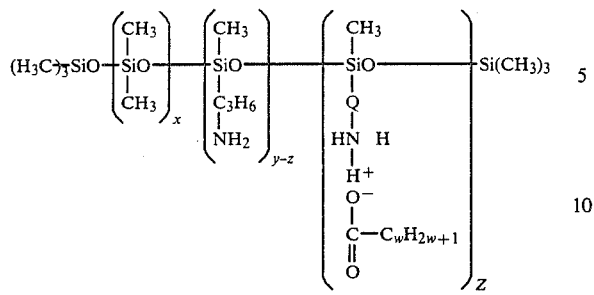

and wherein Q is —$C_3H_6$—, x is 10 to 1000, y is 2 to 200, Z is less than y and w is greater than or equal to 14. The formula defines an amine/acid salt reaction wherein some but not all of the amino groups of the polyamine fluid are reacted with a fatty acid resulting in a polysiloxane copolymer having both free amino alkyl and amine salt functionalities.

Alternatively, the mixture may be heated to the amidization temperature thereof to produce

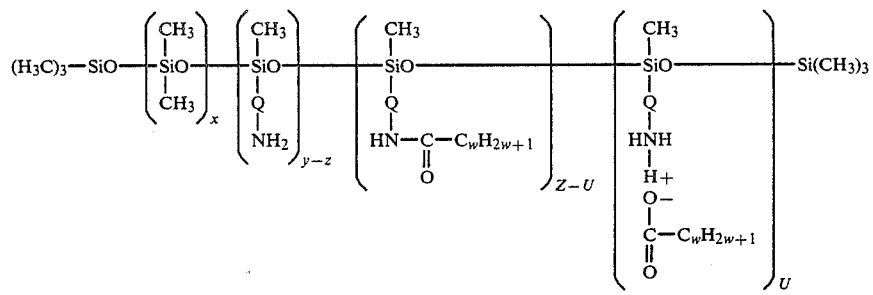

or wherein U is a positive integer less than Z. The product includes both unreacted amine, amine salts and amide groups. The production of water results from the amide reaction, the water being removed from the reaction product.

The polyamine fluid is an amine functional silicone polymer which is preferably a dimethyl fluid having trimethyl end blocking. Examples of polyamine fluids are GP-4 silicone fluid, sold by Genesee Polymers Corporation, Flint, Mich. having the formula

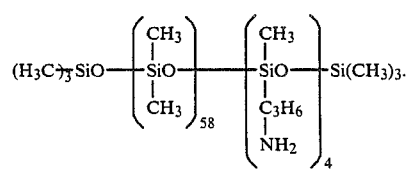

Another example of a polyamine silicone fluid is GP-6 silicone fluid, sold by Genesee Polymers Corporation having the the formula

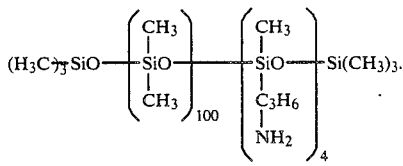

There are many saturated aliphatic carboxylic acids which may be utilized in the instant invention. These acids are referred to as fatty acids. Preferably, stearic acid (w equaling 17) is used and is found to impart excellent characteristics of detergent resistance, as well as rust protection. Other carboxylic acids, such as palmitic and behenic, may be used and incorporated into the invention. The acids may be purchased from Sealand Corporation, Cleveland, Ohio, Witco Corporation, New York, N.Y.; or Emery Corporation Cincinnati, Ohio.

The mixture of the polyamine silicone fluid and acid at room temperature produce amine salts of the polyamine silicone fluid and an acid. Alternatively, the mixture may be heated to the amidization temperature to produce a mixture of units having either amine salts or amine group. If heating is continued until no further water is driven from the system, then the product will include substantially no amine salts. It is critical however that some amine groups remain unreacted.

Both primary and secondary amine groups of the amine alkyl side chain of the polysiloxane copolymer may react with the carboxylic acid to form amine salts, or amide groups pursuant to the mechanism described above.

Depending on the combination of the saturated aliphatic carboxylic acid and polyamine fluid used, the amidization temperature may range between 200° F. and 400° F. Utilizing the specific combintion of GP-4 and stearic acid, the amidization temperature is approximately 280° F.

A water immiscible solvent may be added to the mixture. The solvent may be chosen from the common solvents utilized in car polishes, such as hexane, toluene, xylene and mineral spirits.

The subject protective coating may be utilized alone, in combination with the aforementioned solvent, or as an additive to common constituents of car polishes. For example, the subject protective coating may be added to other waxes or copolymers in order to produce increased desirable characteristics. The subject copolymer may be used as an emulsion. The copolymer is added to emulsifying agent and a small amount of water under high shear conditons. Examples of emulsifying agents are tridecylalcohol ethoxylate containing six moles of ethylene oxide and a nonylphenolethoxylate containing twenty moles of ethylene oxide. A thick paste from results mixing the components and additional water is then added to obtain a desired consistency. Generally, the emulsion is 40 to 50 percent active.

The subject protective coating not only provides excellent detergent resistance, gloss and ease of rub out, but unexpectedly provides excellent rust resistance. Accordingly, the instant invention may be utilized as a sealant or underbody coating for rust protection. Once again, the subjective protective coating may be also added to other rust inhibitors well known in the art to impart improved protection.

The instant invention further provides a method of making the subject protective coating. Generally, the method includes the steps of mixing the polyamine fluid including the primary amino groups with a saturated aliphatic carboxylic acid. The mixture is heated to the amidization temperature of the mixture and a polysiloxane fluid is produced including the amino groups and amide groups and water.

As stated above, a water immiscible solvent may be added to the polyamine fluid and carboxylic acid mixture prior to heating of the mixture.

Upon production of the polysiloxane fluid including both the amine and amide primary groups, the solvent may be either stripped from the produced polysiloxane fluid or may be left in the fluid and used as a polish.

Preferably, the mixture of the polyamine fluid and carboxylic acid is heated under inert atmosphere. For example, an inert nitrogen atmosphere may be used.

The reactants may be added in any order. The mixture, containing or not containing solvent, is heated. The produced water is removed through a phase splitter as the mixture is heated to the amidization temperature. The solvent may be recycled through the system and returned to the reaction vessel. Heating is continued until no further water is removed from the reaction vessel.

Upon completion of the reaction, other waxes, abrasives, perfumes or other known formulas known in the art may be added to the coating.

The coating provides excellent protection to vinyl, rubber, leather, and rust inhibition to painted or non-painted metal.

It is hypothesized that the amide formation provides a more waxy material which inhibits moisture and air permeability. The amine functionality is a known corrosion inhibitor and provides the ability to cure through the amine with ambient carbon dioxide.

EXAMPLES

Example 1

1000 grams of a polyamine fluid (GP-4 sold by Genesee Polymers Corporation, Flint, Mich.), was reacted with 104.2 grams of $C_{17}H_{35}COOH$(stearic acid) at a ratio of 1 mole of stearic acid to 2 amine groups and was heated to reflux. 6.6 grams of product was removed in a Dean and Stark trap. The amine was neutralized with 22 grams of glacial acetic acid.

The resulting product has a thin petrolatum consistency and a melting point of 100° F. When emulsified and applied to vinyl, this product exhibits superior detergent resistance when compared to products currently marketed for vinyl care.

The comparison was made by the product being applied to a strip of black vinyl in a uniform 6 inch circle and the excess being wiped off and allowed to sit over night. The stip of vinyl is then wetted evenly and soap was applied consistently over various pieces of vinyl and rinsed off. Under this test, the reactant product exhibited superior detergent resistance. When used in car polish formulations, this product showed superior gloss characteristics.

Example 2

A polyamine silicone fluid, GP-6 sold by Genesee Polymers Corporation, Flint, Mich. was combined with stearic acid in 1 to 2 ratio. The resulting product had a thick petrolatum consistency and a melting point of 110° F. When tested in a car polish formulation, this product exhibits excellent rust inhibiting properties when compared to dimethyl silicones and amine functional silicones.

Example 3

A comparison was made between (a) a polyamine silicone fluid (GP-4, Genesee Polymers), (b) a sample made as in Example 1, (c) a salt of the polyamine fluid (GP-4, Genesee Polymers) and stearic acid at a 2 to 1 ratio pursuant to the instant invention, and (d) a sample made as in Example 1 except that the polyamine fluid (GP-4, Genesee Polymers) and stearic acid were mixed at a 4 to 1 ratio; thereby completely amidizing all free amine groups.

The results of a rust inhibitor detergent resistance, initial gloss tests are summarized in Table 1 below:

| Sample | Rust Inhibitor Results | Detergent Resistance Results | Initial Gloss Results |
| --- | --- | --- | --- |
| a | ++ | ++ | ++ |
| b | + | + | + |
| c | +++ | +++ | +++ |
| d | − | − | − |

In the rust inhibotor test, each sample is applied to a clean steel panel, allowed to sit 24 hours and then sprayed with a 5% salt solution every 15 minutes for two hours. Results were determined by visual inspection. Gloss tests were performed by application of each sample to a clean piece of black vinyl in a four inch circle and visually inspected after twenty four hours. The vinyl is of the type used on automobile vinyl tops.

The detergent tests were conducted with the vinyl strips wherein the applied samples were washed with 5% detergent solution and gone over with a light bristle brush for ten scrub cycles. The samples were rinsed with water and the cycle was repeated five times and then visually inspected Example 4

|   | Ingredients | % by Weight |
|---|---|---|
| A. | (1) Gp-10-1000 cstk (dimethyl silicone fluid) | 3.0 |
|   | (2) GP-4104 Silicone Fluid | 3.0 |
|   | (3) Hoechst Wax S | 1.5 |
|   | (4) Carnauba Wax #3 | 1.0 |
|   | (5) Oleic Acid | 1.5 |
|   | (6) Mineral Spirits | 4.6 |
| B. | (7) Water | 83.6 |
|   | (8) Carbopol 934 | .2 |
|   | (9) Triethanol Amine 99% | .2 |
|   | (10) Morpholine | 1.4 |

Procedure

A. Combine (1) through (6) and heat to 150° F. with mixing.

B. Heat (7) to 100° F., with high mixing add (8) to (7). Once (8) is dissolved add (9). Add (10) to part B. just before C.

C. Add A. to B. slowly, with high shear blend until emulsion reaches 70° F.

Sources (1) Genesee Polymers Corporation, Flint, Mich.
(2) Genesee Polymers Corporation, Flint, Mich.
(3) American Hoechst Corporation, Elk Grove, IL
(4) Dura Commodities Corporation, Harrison, NY
(8) BF Goodrich Company, Cleveland OH
(9) Ashland Chemical, Columbus, OH

What is claimed is:

1. A protective coating consisting essentially of a polysiloxane copolymer having the formula

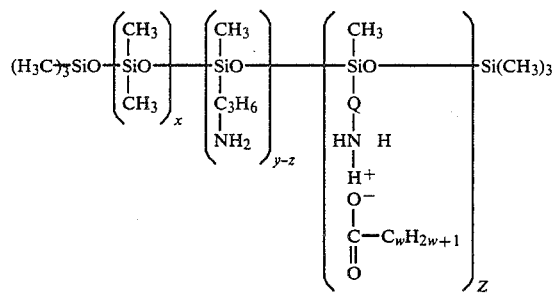

characterized by being prepared by reacting a trimethyl end blocked polyamine silicone fluid having the formula

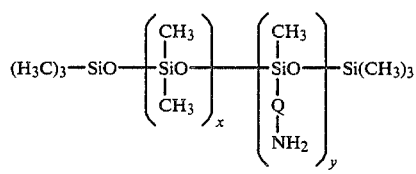

with a saturated aliphatic carboxylic acid having the formula

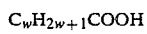

$C_wH_{2w+1}COOH$ wherein Q is $-C_3H_6-$ to produce the polysiloxane copolymer and x is 10 to 1000, y is 2 to 200, Z is less the y and w is greater than or equal to 14.

2. A method of making a protective coating which comprises the steps of mixing and reacting a trimethyl end blocked polyamine silicone fluid having the formula

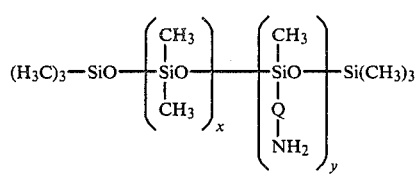

with a saturated aliphatic carboxylic acid

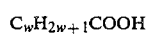

$C_wH_{2w+1}COOH$ and producing a polysiloxane copolymer having the formula

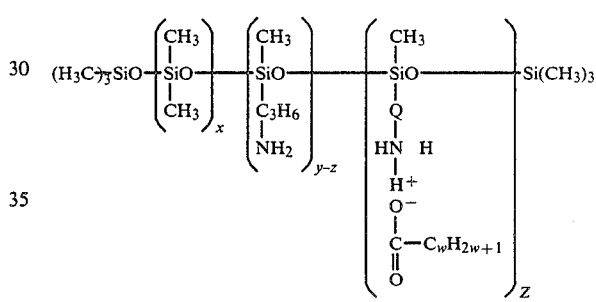

wherein Q is $-C_3H_6-$, x is 10 to 1000, y is 2 to 200, Z is less than y and w is greater than or equal to 14..

3. A protective coating consisting essentially of a polysiloxane copolymer characterized by containing amine units of the formula

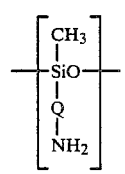

and either amide units of the formula

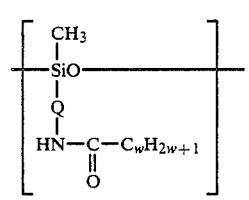

or amine salt units of the formula

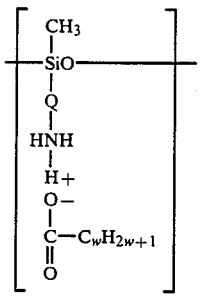

(c)

wherein W is greater than or equal to 14 and Q is $-C_3H_6-$.

4. A coating as set forth in claim 1 further characterized by x being between 58 and 100, y being 4, Z being 2 and w being 17 and Q is $-(C_3H_6)-$.

5. A coating as set forth in claim 1 further characterized by including a water immiscible solvent.

6. A method as set forth in claim 2 further characterized by x being between 58 and 100, y being 4, Z being 2, and w being 17 and Q is $-(C_3H_6)-$.

7. A method as set forth in claim 2 further characterized by heating the polyamine silicone fluid and carboxylic acid to a temperature between 200° F. and 400° F. to reach the amidization temperature.

8. A method as set forth in claim 7 further characterized by heating the polyamine fluid and carboxylic acid to 280° F. to reach to amidization temperature.

9. A method as set forth in claim 8 further characterized by adding a water immiscible solvent to the polyamine silicone fluid and to the saturated aliphatic carboxylic acid prior to heating the mixture.

10. A method as set forth in claim 9 further characterized by stripping the solvent from the produced polysiloxane copolymer.

11. A method as set forth in claim 2 further characterized by heating the mixture under an inert atmosphere.

12. A method as set forth in claim 11 further characterized by the inert atmosphere being nitrogen.

* * * * *